US012629908B2

(12) United States Patent
Umetsu et al.

(10) Patent No.: US 12,629,908 B2
(45) Date of Patent: May 19, 2026

(54) ROLL PRESS APPARATUS, PRESSING METHOD, AND SOLID-STATE BATTERY

(71) Applicant: HONDA MOTOR CO., LTD., Tokyo (JP)

(72) Inventors: Kenta Umetsu, Saitama (JP); Takashi Toyoshima, Saitama (JP); Yohei Noji, Saitama (JP); Kosei Miyata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 17/935,938

(22) Filed: Sep. 28, 2022

(65) Prior Publication Data

US 2023/0099194 A1 Mar. 30, 2023

(30) Foreign Application Priority Data

Sep. 30, 2021 (JP) ................................ 2021-162043

(51) Int. Cl.
| | |
|---|---|
| *B30B 3/00* | (2006.01) |
| *B30B 3/04* | (2006.01) |
| *H01M 4/04* | (2006.01) |

(52) U.S. Cl.
CPC ................ *B30B 3/005* (2013.01); *B30B 3/04* (2013.01); *H01M 4/0435* (2013.01)

(58) Field of Classification Search
CPC .. B30B 3/00; B30B 3/005; B30B 3/04; B30B 3/045; B21B 27/032; B21B 27/035; B22F 3/18; H01M 4/0435
USPC ............................................ 100/176; 419/69
See application file for complete search history.

(56) References Cited

U.S. PATENT DOCUMENTS

| | | | | |
|---|---|---|---|---|
| 2,904,829 A | * | 9/1959 | Heck ........................ | B22F 3/18 72/224 |
| 3,017,665 A | * | 1/1962 | Dasher ..................... | B22F 3/18 425/367 |
| 3,162,708 A | * | 12/1964 | Lund ........................ | B22F 3/18 419/69 |

(Continued)

FOREIGN PATENT DOCUMENTS

| | | |
|---|---|---|
| CN | 203281336 U | 11/2013 |
| CN | 109728255 A | 5/2019 |

(Continued)

OTHER PUBLICATIONS

Notification of Reasons for Refusal issued Sep. 3, 2024 in the JP Patent Application No. 2021-162043.

(Continued)

*Primary Examiner* — Bobby Yeonjin Kim
*Assistant Examiner* — P Derek Pressley
(74) *Attorney, Agent, or Firm* — CKC & Partners Co., LLC

(57) ABSTRACT

An edge of a pressing target is suppressed from cracking. A roll press apparatus 100 has a roller 30 that presses a pressing target M. The roller 30 includes a first roller part 31 that presses the pressing target M in a radial direction of the roller 30 and a second roller part 32 that protrudes further than the first roller part 31 in the radial direction on each side of the first roller part 31 in an axial direction of the roller 30 to make contact with the pressing target M in the axial direction. Each of the second roller parts 32 has an elastic member E2 at least in a portion in contact with the pressing target M.

16 Claims, 5 Drawing Sheets

(56)     References Cited

U.S. PATENT DOCUMENTS

| | | | |
|---|---|---|---|
| 2019/0131614 A1 | 5/2019 | Hirukawa et al. | |
| 2020/0067068 A1* | 2/2020 | Lee .................. | H01M 10/0585 |
| 2021/0129459 A1 | 5/2021 | Wilms et al. | |

FOREIGN PATENT DOCUMENTS

| | | | | |
|---|---|---|---|---|
| CN | 110248787 A | 9/2019 | | |
| CN | 110556568 A | 12/2019 | | |
| CN | 209794633 U | 12/2019 | | |
| EP | 2653229 A1 | 10/2013 | | |
| JP | S59114203 U | 8/1984 | | |
| JP | 2006310872 A | 11/2006 | | |
| JP | 2012214032 A * | 11/2012 | ............. | B32B 27/08 |
| JP | 2012530843 A | 12/2012 | | |
| JP | 2017144473 A | 8/2017 | | |
| WO | 2010147640 A1 | 12/2010 | | |

OTHER PUBLICATIONS

Notification of Reasons for Refusal issued Oct. 29, 2024 in the JP Patent Application No. 2021-162043.

Office Action issued Jan. 9, 2025 in the CN Patent Application No. 202211097188.7.

* cited by examiner

〈Comparative example〉

FIG. 4

ROLL PRESS APPARATUS, PRESSING METHOD, AND SOLID-STATE BATTERY

This application is based on and claims the benefit of priority from Japanese Patent Application No. 2021-162043, filed on 30 Sep. 2021, the content of which is incorporated herein by reference.

BACKGROUND OF THE INVENTION

Field of the Invention

The present invention relates to a roll press apparatus that presses a pressing target.

Related Art

Development of secondary batteries is in progress to reduce adverse environmental impact. Examples of the secondary batteries include a solid-state battery having a solid electrolyte between a positive electrode and a negative electrode. The electrodes of the solid-state battery are required to be densified, i.e., to have high density, for reduction of electrical resistance at the interfaces between the electrodes and the solid electrolyte.

Patent Document 1: Japanese Unexamined Patent Application (Translation of PCT Application), Publication No. 2012-530843

SUMMARY OF THE INVENTION

The inventors of the present invention attempted to press a plate-shaped electrode with a roll press apparatus (see, e.g., Patent Document 1) for densification in view of mass production of the electrode. However, this pressing may result in a cracked edge, i.e., the plate-shaped electrode may crack at an edge in a width direction. Similar problems may arise when a member other than the plate-shaped electrode is pressed.

Under these circumstances, the present invention has been achieved to suppress a pressing target from cracking at an edge.

When the pressing target is pressed in a radial direction of the roller and simultaneously in an axial direction under a suitable load, the pressing target is less likely to crack at the edge. Based on this finding, the inventors of the present invention have achieved the present invention. The present invention relates to a roll press apparatus of the following aspects (1) to (12), a pressing method of aspect (13) to (16), and a solid-state battery of aspect (17).

(1) A roll press apparatus including a roller that presses a pressing target, wherein the roller includes a first roller part that presses the pressing target in a radial direction of the roller and a second roller part that protrudes further than the first roller part in the radial direction on each side of the first roller part in an axial direction of the roller to make contact with the pressing target in the axial direction, and each of the second roller parts has an elastic member at least in a portion in contact with the pressing target.

According to aspect (1), the pressing target is pressed in the radial direction by the first roller part and simultaneously in the axial direction by the second roller parts. At this time, each second roller part presses the pressing target in the axial direction via the elastic member. This allows easy application of a suitable pressing load to the pressing target in the axial direction. For example, if the pressing target has a large dimensional error, the pressing load applied to the pressing target in the axial direction is considered to greatly vary from an estimated load. Use of the elastic member can reduce the error from the estimated load. Thus, an estimated suitable pressing load in the axial direction is easily applied to the pressing target. As a result, the suitable pressing load in the axial direction is easily applied to the pressing target when the pressing target is pressed in the radial direction of the roller, suppressing the pressing target from cracking at the edge.

(2) The roll press apparatus of aspect (1), further including: a separate roller that presses the pressing target from a position opposite to the former roller, wherein the separate roller includes a third roller part that faces the first roller part and anti-interference parts that respectively face the second roller parts, outer peripheral surfaces of the anti-interference parts are located inward of an outer peripheral surface of the third roller part in a radial direction of the separate roller, and the second roller parts protrude inward in the radial direction of the separate roller beyond the outer peripheral surface of the third roller part.

According to aspect (2), a contact area between the second roller parts and the pressing target increases compared to when the second roller parts just protrude to the outer peripheral surface of the third roller part. This can more efficiently suppress the pressing target from cracking at the edge.

(3) The roll press apparatus of aspect (1) or (2), wherein a heat resistant portion having higher heat resistance than an other portion is provided in a portion of the elastic member including a surface in contact with the pressing target.

According to aspect (3), the heat resistant portion can protect the elastic member from damage when pressing or the like the heated pressing target.

(4) The roll press apparatus of any one of aspects (1) to (3), wherein a coefficient of friction between the elastic member and the pressing target is equal to or less than 0.5.

According to aspect (1), the roller has the second roller parts. Thus, the roller may possibly draw the pressing target in the rotating direction of the roller more easily than when the roller has no second roller parts. According to aspect (4), such an adverse effect, can be reduced because the coefficient of friction between the elastic member and the pressing target is equal to or less than 0.5.

(5) The roll press apparatus of any one of aspects (1) to (4), wherein a modified portion is provided in a portion of the elastic member in contact with the pressing target. (6) The roll press apparatus of aspect (5), wherein the modified portion is formed by applying a fluorine coating to a surface of the elastic member.

According to aspect (5), the modified portion can improve heat resistance and durability. According to aspect (6), the modified portion can be formed by applying a fluorine coating to the elastic member.

(7) The roll press apparatus of any one of aspects (1) to (6), wherein the elastic member, includes a plurality of elastic bodies having different elastic moduli.

According to aspect (7), the elastic bodies having different elastic moduli can be suitably used. For example, the elastic body having relatively high heat resistance and durability is used for a portion of the elastic member in direct contact with the pressing target, and the elastic body having relatively low heat resistance and durability is used for an other portion of the elastic member. This leads to cost reduction.

(8) The roll press apparatus of aspect (7), wherein at least one of the elastic bodies is made of acrylic rubber, fluorine rubber, or silicone rubber.

According to aspect (8), the roll press apparatus of aspect (7) can be achieved using the elastic bodies made of these materials.

(9) The roll press apparatus of any one of aspects (1) to (8), wherein a portion of the roller having the elastic member is detachably attached to an other portion of the roller.

According to aspect (9), when the elastic member becomes worn, only the portion including the elastic member needs to be replaced, not the entire roller. This leads to cost reduction.

(10) The roll press apparatus of any one of aspects (1) to (9), wherein the elastic member is a second elastic member, and the first roller part has a first elastic member at least in a portion in contact with the pressing target.

According to aspect (10), a suitable pressing load is easily applied to the pressing target not only in the axial direction of the roller, but also in the radial direction of the roller.

(11) The roll press apparatus of aspect (10), wherein the first elastic member and the second elastic member have different elastic moduli.

According to aspect (11), the first elastic member and the second elastic member having different elastic moduli can cope with the case when flexibilities required in the radial direction and the axial direction are different in the pressing.

(12) The roll press apparatus of any one of aspects (1) to (11), wherein the pressing target is a plate-shaped electrode.

The plate-shaped electrode (especially a plate-shaped electrode of a solid-state battery) is required to be densified for reduction of electrical resistance, and to be mass-produced. The roll press apparatus of aspects (12) and (13) allows mass production of a densified plate-shaped electrode.

(13) A pressing method using a roll press apparatus having a roller that presses a pressing target, the roller including a first roller part that presses the pressing target in a radial direction of the roller and a second roller part that protrudes further than the first roller part in the radial direction on each side of the first roller part in an axial direction of the roller to make contact with the pressing target in the axial direction, each of the second roller parts having an elastic member at least in a portion in contact with the pressing target, the method including: a pressing step of pressing the pressing target in the radial direction using the first roller part and simultaneously in the axial direction using the second roller parts.

According to aspect (13), the pressing target is actually pressed by the first and second roller parts, and can be suppressed from cracking at an edge.

(14) The pressing method of aspect (13), further including: a pressing target heating step of heating the pressing target, wherein the pressing target heated in the pressing target heating step is pressed in the pressing step.

According to aspect (14), the pressing target that is heated and softened is pressed. This can efficiently densify the pressing target.

(15) The pressing method of aspect (13) or (14), further including: a roller heating step of heating the roller, wherein the pressing target is pressed in the pressing step using the roller heated in the roller heating step.

According to aspect (15), when the pressing target is already heated, for example, the roller is kept, from taking the heat of the pressing target. For example, when the pressing target has not been heated, the heated roller may be used to heat, soften, and press the pressing target.

(16) The pressing method of any one of aspects (13) to (15), wherein the pressing target is a plate-shaped electrode.

The pressing method of aspect (16) can provide the same advantages as those of the roll press apparatus of aspect (12).

(17) A solid-state battery, including: the plate-shaped electrode pressed using the roll press apparatus of aspect (12); and a solid electrolyte in contact with the plate-shaped electrode.

According to aspect (17), the plate-shaped electrode is densified, reducing electrical resistance at the interface between the electrode and the solid electrolyte. In addition, cracking at an edge of the plate-shaped electrode can be suppressed.

As described above, the present invention allows the pressing target to be pressed in the radial direction of the roller and simultaneously pressed in the axial direction under a suitable pressing load, thereby suppressing the edge of the pressing target from cracking.

BRIEF DESCRIPTION OF THE DRAWINGS

FIG. 2 is a front view illustrating the roll press apparatus;

FIG. 3 is a front view illustrating a roll press apparatus of a comparative example;

FIG. 4 is a perspective view illustrating a roll press apparatus of a first variation.

DETAILED DESCRIPTION OF THE INVENTION

An embodiment of the present invention will be described below with reference to the drawings. Note that the present invention is not limited to the following embodiment, and modifications can be made as appropriate without departing from the scope of the invention.

First Embodiment

Figure 1:
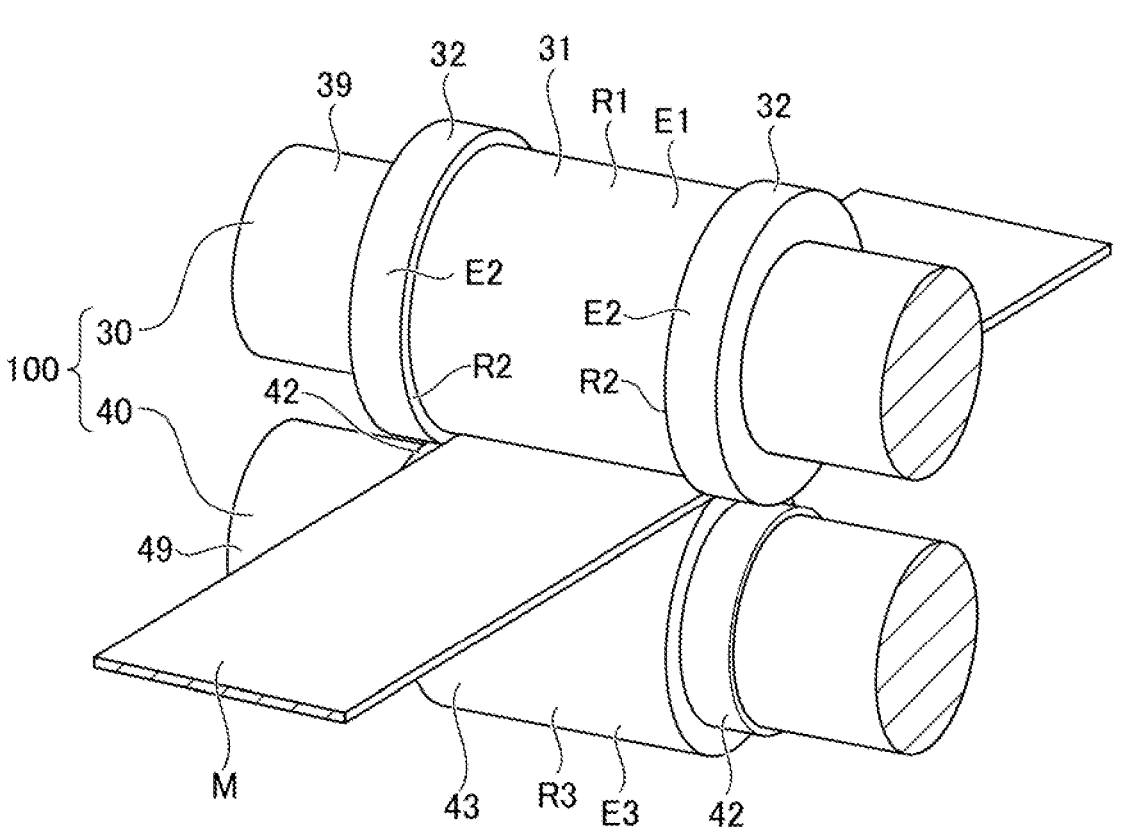
FIG. 1 is a perspective view illustrating a roll press apparatus of a first embodiment.

FIG. 1 is a perspective view illustrating a roll press apparatus 100 of the present embodiment. The roll press apparatus 100 includes an upper roller 30 and a lower roller 40 that are arranged one above the other. The upper roller 30 presses a pressing target M from, above, and the lower roller 40 is a separate roller that presses the pressing target M from below. The pressing target M is a plate-shaped electrode (a positive electrode plate Mp or a negative electrode plate Mn) of a solid-state battery 200 schematically shown in FIG. 5. The roll press apparatus 100 shown in FIG. 1 includes a power unit (not shown) that rotates the upper roller 30 and the lower roller 40, and a controller (not shown) that controls the power unit. The roll press apparatus 100 rotates the rollers at a speed of about 100 m/min to 200 m/min.

The upper roller 30 includes an upper journal 39, a first roller part 31, and two second roller parts 32. The first roller part 31 and the two second roller parts 32 are attached to the upper journal 39, and rotate together with the upper journal 39. The first roller part 31 protrudes radially outward from the upper journal 39. The second roller parts 32 protrude further radially outward than the first roller part 31 on one side and the other side of the first roller part 31 in an axial direction.

The lower roller 40 includes a lower journal 49, a third roller part 43, and two anti-interference parts 42. The third roller part 43 is attached to the lower journal 49, and rotates together with the lower journal 49. The third roller part 43 protrudes radially outward from the lower journal 49, and faces the first roller part 31. An axial length of the third roller part 43 is approximately equal to an axial length of the first roller part 31.

The anti-interference parts 42 are formed as part of the lower journal 49 or attached to the lower journal 49, and rotate together with the lower journal 49. The anti-interference parts 42 respectively face the second roller parts 32. Outer peripheral surfaces of the anti-interference parts 42 are located radially inward of an outer peripheral surface of the third roller part 43. The anti-interference parts 42 allow the second roller parts 32 to protrude such that the outer peripheral surfaces of the second roller parts 32 are located inward in a radial direction of the lower roller 40 beyond the outer peripheral surface of the third roller part 43. Specifically, a lower end of the outer peripheral surface of each second roller part 32 is located below an upper end of the outer peripheral surface of the third roller part 43.

The first roller part 31 presses the pressing target M downward, i.e., outward in a radial direction of the first roller part 31. The third roller part 43 presses the pressing target M upward, i.e., outward in a radial direction of the third roller part 43. The first and third roller parts 31 and 43 press the pressing target M Inward in a thickness direction of the pressing target M (inward in a vertical direction).

The two second roller parts 32 make contact with the pressing target M from both sides in a width direction of the pressing target M (both sides in the axial directions of the rollers 30 and 40) when the first and third roller parts 31 and 43 press the pressing target M inward in the thickness direction. The two second roller parts 32 press the pressing target M inward in the width direction.

Specific configurations of the first to third roller parts 31, 32 and 43 will be described below. Each of the first and third roller parts 31 and 43 may be made entirely of metal, or may have an elastic member E1 or E3 at least in a portion including a surface in contact with the pressing target M (i.e., the outer peripheral surface) as shown in FIG. 1. In the latter case, each of the first and third roller parts 31 and 43 may have the elastic member E1 or E3 only on, for example, the outer peripheral surface and its periphery, or may be made entirely of the elastic member E1 or E3.

Each of the second roller parts 32 has an elastic member E2 at least in a portion including a side surface facing the pressing target M. Specifically, each of the second roller parts 32 may be made entirely of the elastic member E2 as shown in FIG. 1, or may have the elastic member E2 only on the side surface facing the pressing target H and its periphery.

In the following description, the elastic member E1 if provided for the first roller part 31 will be referred to as a "first elastic member E1", the elastic members E2 for the second roller parts 32 will be referred to as "second elastic members E2", and the elastic member E3 if provided for the third roller part 43 will be referred to as a "third elastic member E3". The first to third elastic members E1 to E3 may be made of acrylic rubber, fluorine rubber, or silicone rubber. A specific example of the silicone rubber is αGEL (registered trademark).

The first and second elastic members E1 and E2 have different elastic moduli. Thus, a suitable pressing load is applied to the pressing target M in each of the thickness direction (the radial direction of the upper roller 30) and the width direction (the axial direction of the upper roller 30). Note that the first and second elastic members E1 and E2 may have the same elastic modulus if the first and second elastic members E1 and E2 having the same elastic modulus apply suitable pressing loads in the thickness direction and the width direction. For the same reason, the first and third elastic members E1 and E3 may have different elastic moduli or the same elastic modulus.

A portion of the upper roller 30 including the second elastic member E2 is detachably attached to an other portion of the upper roller 30. Three examples of how this portion is attached will be described below. In a first example, as shown in FIG. 1, each second roller part 32 is entirely constituted by the second elastic member E2, and the entire second roller part 32 is detachably attached to an other portion of the upper roller 30 other than the second roller part 32. In a second example, only a portion of each second roller part 32 (a portion including the side surface facing the pressing target M) is constituted by the second elastic member E2, and only the second elastic member E2 is detachably attached to an other portion of the upper roller 30. In a third example, only a portion of each second roller part 32 is constituted by the second elastic member E2, and the entire second roller part 32 is detachably attached to an other portion of the upper roller 30 other than the second roller part 32. For example, the second roller parts may be fitted to and/or screwed to the upper roller.

The side surface of each second elastic member E2 facing the pressing target M has a fluorine coating applied thereto to form a modified portion R2. The modified portion R2 serves as a heat resistant portion having a higher heat resistance than an other portion of the second elastic member E2 and a durable portion that is less susceptible to damage than the other portion. The modified portion R2 is resistant to heat of about 250° C. to 350° C. A coefficient of friction between the modified portion R2 of each second roller part 32 and the pressing target M is equal to or less than 0.5.

In the same manner as the side surfaces of the second elastic members E2, the outer peripheral surface of the first elastic member E1 may preferably have a fluorine coating applied thereto to form a modified portion R1, and the outer peripheral surface of the third elastic member E3 may preferably have a fluorine coating applied thereto to form a modified portion R3.

A pressing method using the above-described roll press apparatus 100 will be described below. The pressing method includes a roller heating step, a pressing target heating step, and a pressing step.

In the roller heating step, the rollers 30 and 40 are heated with a roller heater. In this step, at least one of the first roller part 31 or the second roller parts 32 of the upper roller 30 is heated. Note that it is preferable to heat both of the first roller part 31 and the second roller parts 32. Specifically, the rollers 30 and 40 are heated to about 45° C. to 200° C. in this roller heating step.

In the pressing target heating step, the pressing target M is heated with a heater for the pressing target to about 45° C. to 200° C. upstream of the rollers 30 and 40. This step softens the pressing target M.

In the pressing step, the pressing target M heated and softened in the pressing target heating step is pressed by the rollers 30 and 40 heated in the roller heating step. This step densifies the pressing target M (the plate-shaped electrode).

Figure 2:
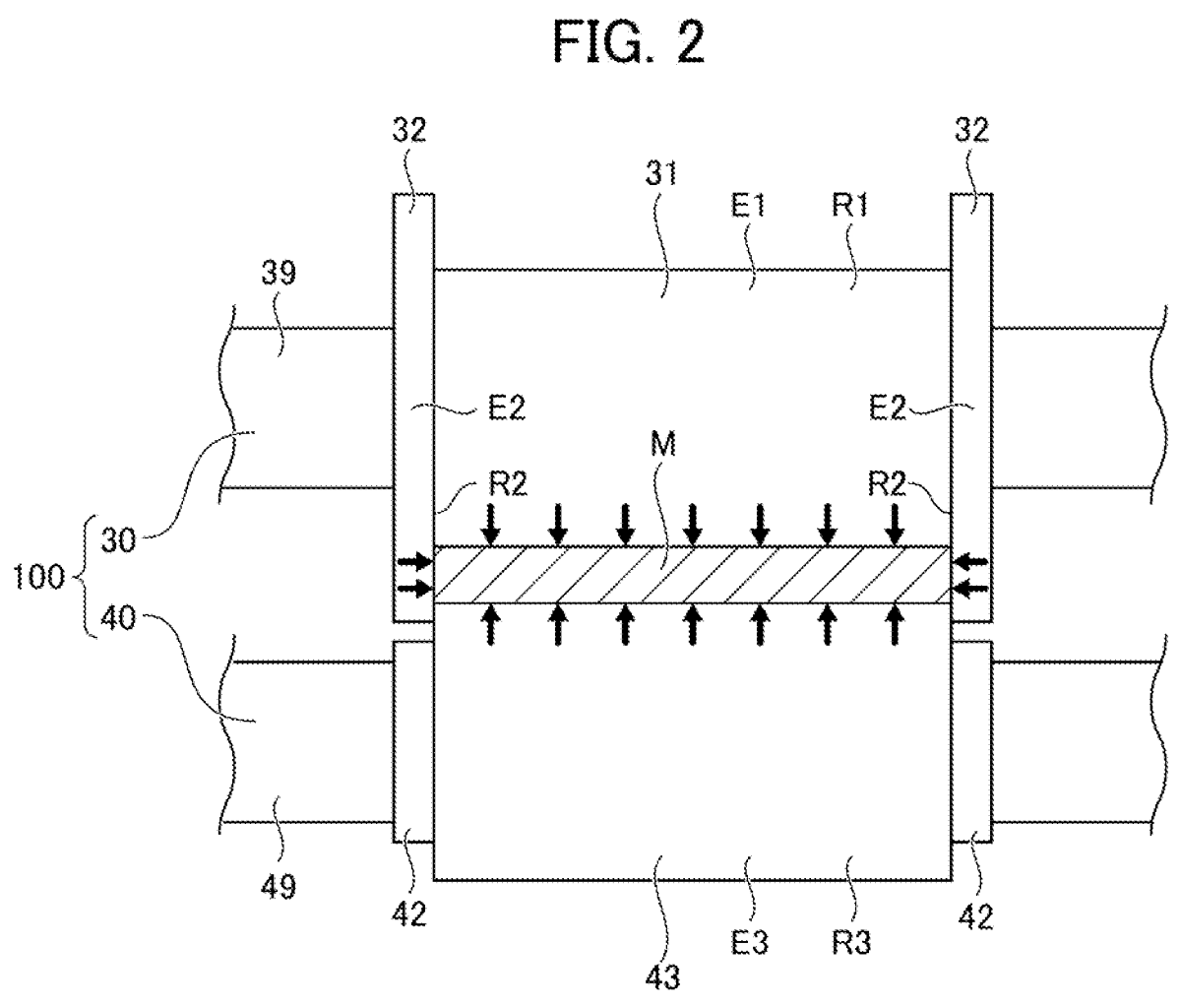
Figure 3:
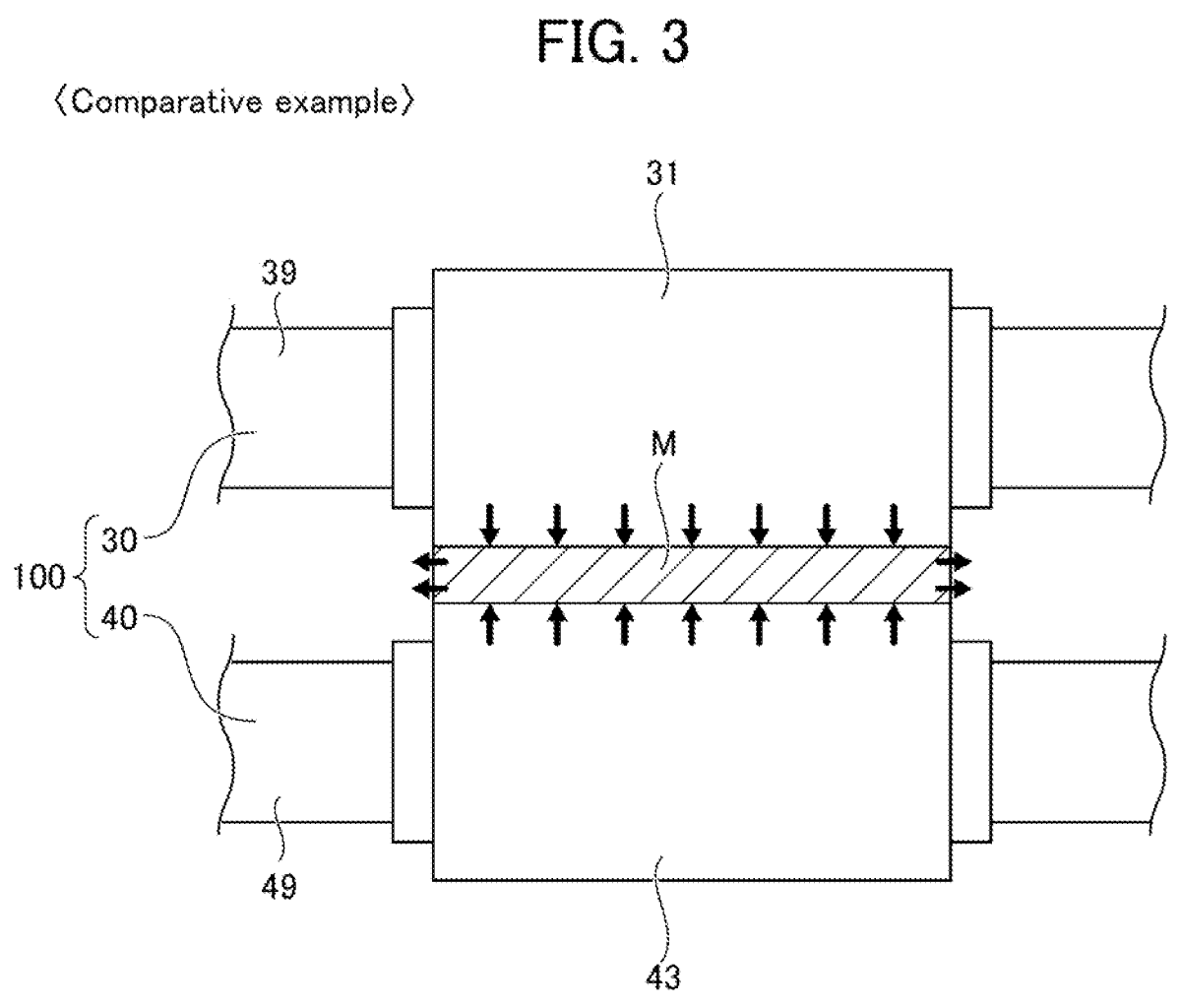

Advantages of the present embodiment will be described below with reference to FIGS. 2 and 3. FIG. 2 is a front sectional view illustrating the roll press apparatus 100 of the present embodiment. FIG. 3 is a front sectional view illustrating a roll press apparatus 100 of a comparative example obtained by removing the two second roller parts 32 from the roll press apparatus 100 of the present embodiment shown in FIG. 2.

When the first and third roller parts 31 and 43 press the pressing target M inward in the thickness direction in the pressing step using the apparatus of the comparative example shown in FIG. 3, part of the pressing load escapes outward in the width direction due to lack of the second roller parts 32. This may cause a crack at the edge in the width direction of the pressing target M.

In the pressing step of the present embodiment shown in FIG. 2, the first and third roller parts 31 and 43 press the pressing target M inward in the thickness direction, and simultaneously, the two second roller parts 32 press the pressing target M inward in the width direction. Thus, the pressing target M is pressed inward in the thickness direction from both sides and inward in the width direction from both sides, i.e., from four sides in total, and the pressing load is less likely to escape outward in the width direction than in the comparative example. This can suppress the pressing target M from cracking at the edge, improving the quality of the pressing target M.

In this step, the second elastic members E2 press the pressing target M from both sides in the width direction. If the first roller part 31 has the first elastic member E1 and the third roller part 43 has the third elastic member E3, the pressing target M is pressed by the first and third elastic members E1 and E3 from both sides in the thickness direction. This allows easy application of suitable pressing loads to the pressing target M in different directions from the surrounding members. For example, if the pressing target M has a large dimensional error, the pressing loads applied to the pressing target M in the different directions from the surrounding members are considered to greatly vary from estimated loads. If the elastic members E1 to E3 are used as described above, the pressing loads less vary from the estimated loads, and are suitably applied to the pressing target M in the different directions from the surrounding members. This can efficiently suppress the pressing target M from cracking at the edge.

The anti-interference parts 42 allows the second roller portion 32 to protrude below the upper end of the third roller portion 43. Thus, a contact area between the second roller parts 32 and the pressing target M increases compared to when the second roller parts 32 just protrude to reach the upper end of the third roller part 43. This can also efficiently suppress the pressing target M from cracking at the edge.

In the present embodiment, the pressing target M is previously heated and softened in the pressing target heating step, and then pressed in the pressing step. Thus, the pressing target M can be densified more efficiently than when the pressing target M is not softened in advance. In addition, the elastic members E1 to E3 have the heat resistant portions constituted by the modified portions R1 to R3. This can reduce adverse effects, such as damage to the elastic members E1 to E3 caused by the heated pressing target M.

In the present embodiment, the portion of the upper roller 30 including the second elastic member E2 is detachably attached to the other portion of the upper roller 30. Thus, when the second elastic member E2 becomes worn, only the portion including the second elastic member E2 needs to be replaced, not the entire upper roller 30. This leads to cost reduction.

In the present embodiment, the upper roller 30 has the second roller parts 32. Thus, the upper roller 30 may possibly draw the pressing target M in the rotating direction of the upper roller 30 more easily than the upper roller 30 of the comparative example having no second roller parts 32. Such an adverse effect can be reduced because the coefficient of friction between the elastic members E2 of the second roller parts 32 and the pressing target M is equal to or less than 0.5.

Figure 5:
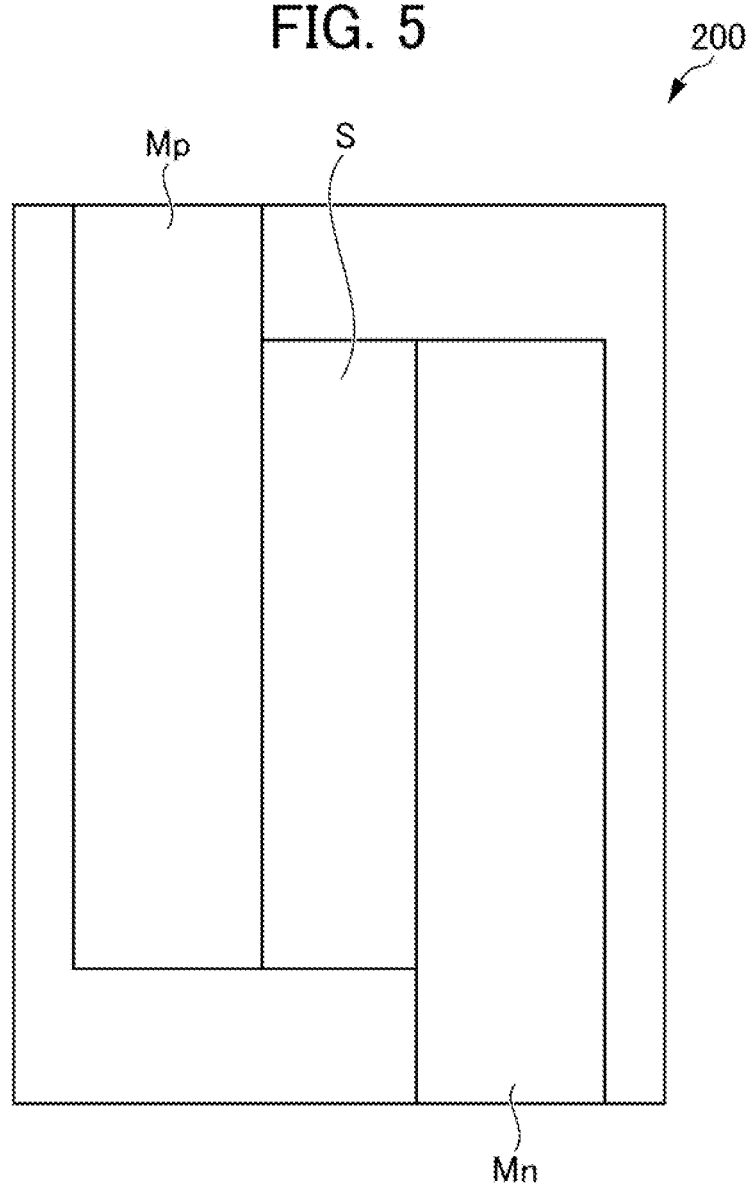
FIG. 5 is a schematic view illustrating a solid-state battery using plate-shaped electrodes produced by the apparatus of the first embodiment.

In the present, embodiment, the pressing target M is the plate-shaped electrode (the positive electrode plate Mp or the negative electrode plate Mn) of the solid-state battery 200 schematically shown in FIG. 5. This plate-shaped electrode is required to be densified for reduction of electrical resistance, and to be mass-produced. The present embodiment allows mass production of the densities plate-shaped electrode (the positive electrode plate Mp or the negative electrode plate Mn) by pressing the pressing target M with the roll press apparatus 100.

Specifically, the solid-state battery 200 includes the positive electrode plate Mp and the negative electrode plate Mn, each of which is the pressing target M (plate-shaped electrode) pressed using the roll press apparatus 100, and the solid electrolyte S sandwiched between the positive electrode plate Mp and the negative electrode plate Mn. For easy recognition, the positive electrode plate Mp, the solid electrolyte S, and the negative electrode plate Mn are illustrated wide in a stacking direction (a lateral direction in the drawing). The stacking direction corresponds to the thickness direction of the positive electrode plate Mp and the negative electrode plate Mn. The positive electrode plate Mp and the negative electrode plate Mn are densified as described above. This reduces the electrical resistance at the interface between the positive electrode plate Mp and the solid electrolyte S and the electrical resistance at the interface between the negative electrode plate Mn and the solid electrolyte S. The positive electrode plate Mp and the negative electrode plate Mn are suppressed from cracking at the edge as described above. This provides the solid-state battery 200 with high quality.

The embodiment described above may be modified as follows, for example.

Figure 4:
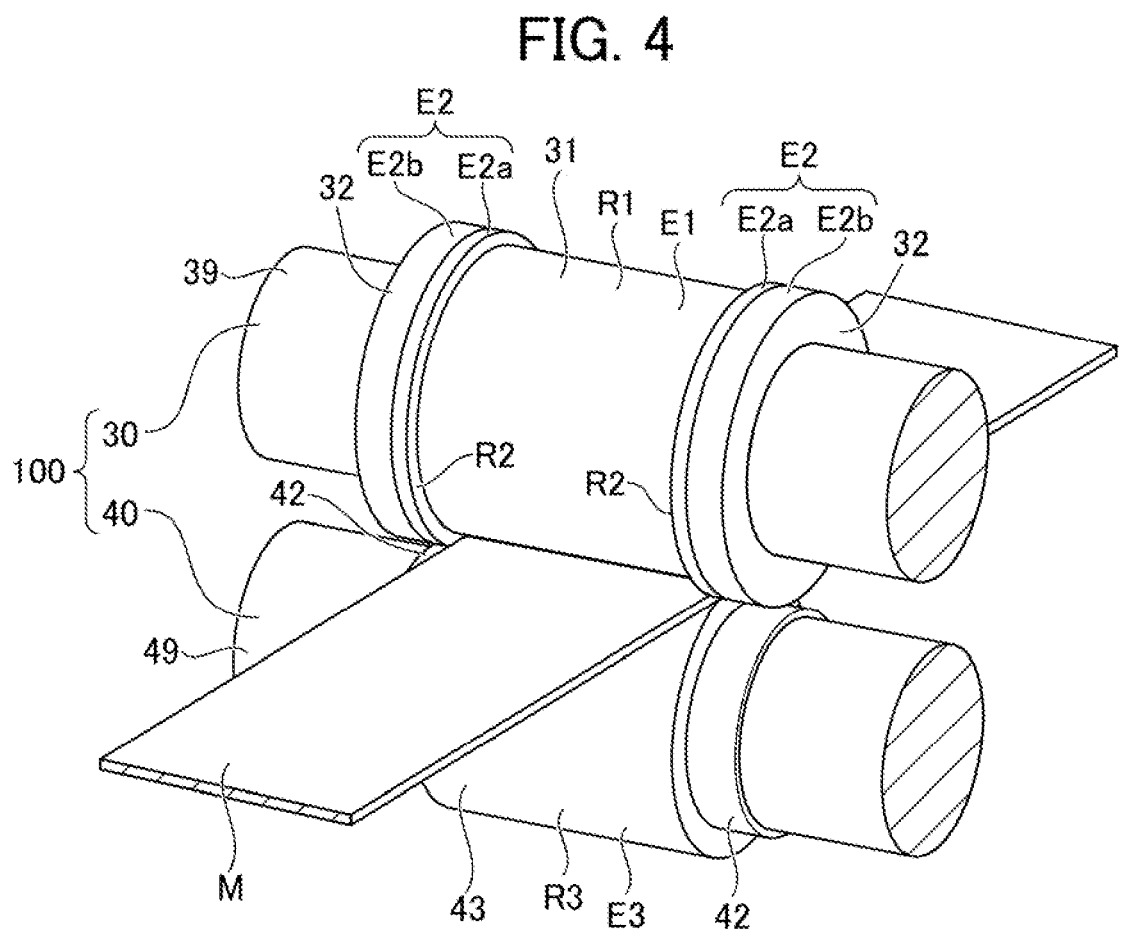

(First Variation) As shown in FIG. 4, the second elastic member E2 may include a plurality of elastic bodies E2a and E2b having different elastic moduli. Specifically, in this variation, the portion of the second elastic member E2 including the side surface in contact with the pressing target M is constituted by the elastic body E2a having relatively high heat resistance and durability, and an other portion of the second elastic member E2 is constituted by the elastic body E2b having relatively low heat resistance and durability. In this case, for example, the former elastic body E2a serves as the heat resistant portion and the durable portion of the elastic member E2. Thus, the fluorine coating can be omitted.

(Second Variation) The roll press apparatus 100 may rotate the rollers at a speed lower than 100 m/min, for example, and the pressing target heating step may be omitted. In the pressing step, the rollers 30 and 40 heated in the roller heating step may heat, soften, and press the pressing target M.

EXPLANATION OF REFERENCE NUMERALS

30 Upper roller
31 First roller part
32 Second roller part
40 Lower roller
43 Third roller part
100 Roll press apparatus
200 Solid-state battery E1 First elastic member
E2 Second elastic member
E2*a* Elastic body
E2*b* Elastic body
E3 Third elastic member
R1 Modified portion of first roller part
R2 Modified portion of second roller part
R3 Modified portion of third roller part
M Pressing target
Mp Positive electrode plate
Mn Negative electrode plate
S Solid electrolyte

What is claimed is:

1. A roll press apparatus, comprising: a roller that presses a pressing target, wherein the roller includes a first roller part that presses the pressing target in a radial direction of the roller and a second roller part that protrudes further than the first roller part in the radial direction on each side of the first roller part in an axial direction of the roller to make contact with the pressing target in the axial direction, and each of the second roller parts has an elastic member at least in a portion in contact with the pressing target, wherein the elastic member includes a plurality of rubber bodies having different elastic moduli and being arranged in the axial direction, a rubber body of the plurality of rubber bodies in contact with the pressing target being higher in heat resistance than a rubber body of the plurality of rubber bodies out of contact with the pressing target.

2. The roll press apparatus of claim 1, further comprising: a separate roller that presses the pressing target from a position opposite to the roller, wherein the separate roller includes a third roller part that faces the first roller part and anti-interference parts that respectively face the second roller parts, outer peripheral surfaces of the anti-interference parts are located inward of an outer peripheral surface of the third roller part in a radial direction of the separate roller, and the second roller parts protrude inward in the radial direction of the separate roller beyond the outer peripheral surface of the third roller part.

3. The roll press apparatus of claim 1, wherein a heat resistant portion having higher heat resistance than an other portion is provided in a portion of the elastic member including a surface in contact with the pressing target.

4. The roll press apparatus of claim 1, wherein a coefficient of friction between the elastic member and the pressing target is equal to or less than 0.5.

5. The roll press apparatus of claim 1, wherein a modified portion is provided in a portion of the elastic member in contact with the pressing target.

6. The roll press apparatus of claim 5, wherein the modified portion is formed by applying a fluorine coating to a surface of the elastic member.

7. The roll press apparatus of claim 1, wherein at least one of the elastic bodies is made of acrylic rubber, fluorine rubber, or silicone rubber.

8. The roll press apparatus of claim 1, wherein a portion of the roller having the elastic member is detachably attached to an other portion of the roller.

9. The roll press apparatus of claim 1, wherein the elastic member is a second elastic member, and the first roller part has a first elastic member at least in a portion in contact with the pressing target.

10. The roll press apparatus of claim 9, wherein the first elastic member and the second elastic member have different elastic moduli.

11. The roll press apparatus of claim 1, wherein the pressing target is a plate-shaped electrode.

12. A pressing method using a roll press apparatus having a roller that presses a pressing target, the roller including a first roller part that presses the pressing target in a radial direction of the roller and a second roller part that protrudes further than the first roller part in the radial direction on each side of the first roller part in an axial direction of the roller to make contact with the pressing target in the axial direction, each of the second roller parts having an elastic member at least in a portion in contact with the pressing target, the method comprising:

a pressing step of pressing the pressing target in the radial direction using the first roller part and simultaneously in the axial direction using the second roller parts, wherein the elastic member includes a plurality of rubber bodies having different elastic moduli and being arranged in the axial direction, a rubber body of the plurality of rubber bodies in contact with the pressing target being higher in heat resistance than a rubber body of the plurality of rubber bodies out of contact with the pressing target.

13. The pressing method of claim 12, further comprising: a pressing target heating step of heating the pressing target, wherein the pressing target heated in the pressing target heating step is pressed in the pressing step.

14. The pressing method of claim 12, further comprising: a roller heating step of heating the roller, wherein the pressing target is pressed in the pressing step using the roller heated in the roller heating step.

15. The pressing method of claim 12, wherein the pressing target is a plate-shaped electrode.

16. A solid-state battery, comprising: the plate-shaped electrode pressed using the roll press apparatus of claim 11; and a solid electrolyte in contact with the plate-shaped electrode.

* * * * *